US008422212B2

(12) United States Patent
Liu et al.

(10) Patent No.: US 8,422,212 B2
(45) Date of Patent: Apr. 16, 2013

(54) ELECTRONIC DEVICE WITH SEPARABLE MODULE

(75) Inventors: Yun-Ping Liu, Keelung (TW); Chih-Ming Chen, Taoyuan County (TW); Chia-Yun Wu, Taipei County (TW)

(73) Assignee: Elitegroup Computer Systems Co., Ltd., Taipei (TW)

( * ) Notice: Subject to any disclaimer, the term of this patent is extended or adjusted under 35 U.S.C. 154(b) by 222 days.

(21) Appl. No.: 13/027,581

(22) Filed: Feb. 15, 2011

(65) Prior Publication Data

US 2011/0304565 A1 Dec. 15, 2011

(30) Foreign Application Priority Data

Jun. 11, 2010 (TW) ................................ 99119204 A

(51) Int. Cl.
  *G06F 1/16* (2006.01)
  *H05K 5/00* (2006.01)
  *H05K 7/00* (2006.01)

(52) U.S. Cl.
  USPC .................................................... 361/679.17

(58) Field of Classification Search ........................ None
  See application file for complete search history.

(56) References Cited

U.S. PATENT DOCUMENTS

| 5,355,357 | A | * | 10/1994 | Yamamori et al. ............ 720/646 |
| 5,519,570 | A | * | 5/1996 | Chung ...................... 361/679.17 |
| 6,480,373 | B1 | * | 11/2002 | Landry et al. ............ 361/679.06 |
| 6,595,786 | B2 | * | 7/2003 | Horiuchi et al. ................. 439/74 |
| 6,842,332 | B1 | * | 1/2005 | Rubenson et al. ....... 361/679.09 |
| 6,922,333 | B2 | * | 7/2005 | Weng et al. ................. 361/679.2 |
| 6,950,038 | B2 | * | 9/2005 | Hsu ................................. 341/22 |
| 6,965,076 | B2 | * | 11/2005 | Wu ............................... 174/541 |
| 7,443,682 | B2 | | 10/2008 | Fan et al. |
| 2002/0085338 | A1 | * | 7/2002 | Lin ............................. 361/680 |
| 2004/0090742 | A1 | * | 5/2004 | Son et al. ...................... 361/686 |
| 2004/0174670 | A1 | * | 9/2004 | Huang et al. ................. 361/683 |
| 2007/0025071 | A1 | * | 2/2007 | Yokote et al. ................ 361/680 |
| 2007/0133160 | A1 | * | 6/2007 | Ma ............................... 361/683 |
| 2008/0019085 | A1 | * | 1/2008 | Nakajima .................... 361/680 |
| 2008/0144262 | A1 | * | 6/2008 | Lai ............................... 361/680 |
| 2008/0193187 | A1 | * | 8/2008 | Tsai ............................. 400/472 |

(Continued)

FOREIGN PATENT DOCUMENTS

| CN | 1479187 | A | 3/2004 |
| CN | 101312636 | A | 11/2008 |
| CN | 101408780 | A | 4/2009 |
| TW | 585290 | U | 4/2004 |

*Primary Examiner* — Lisa Lea Edmonds
*Assistant Examiner* — Xanthia C Cunningham
(74) *Attorney, Agent, or Firm* — Alan Kamrath; Kamrath IP Lawfirm, P.A.

(57) ABSTRACT

An electronic device includes a display unit and a main unit having a separable module and a base. The separable module is provided along two opposite shorter edges with a plurality of hooking elements, and has at least one carrier member located on one side of the separable module. The base includes a plurality of retaining slots corresponding to the hooking elements, and at least one magnetic element located on one side of the base facing toward the carrier member. To cover the separable module onto the base, first cause the carrier member to be magnetically attracted to the at least one magnetic element and align the hooking elements with the retaining slots, and, then, move the separable module for the hooking elements to engage with the retaining slots, so that the separable module is held to the base.

9 Claims, 11 Drawing Sheets

U.S. PATENT DOCUMENTS

2009/0059488 A1* 3/2009 Minaguchi et al. ...... 361/679.09
2009/0102684 A1* 4/2009 Zhang et al. .................... 341/22
2009/0279238 A1* 11/2009 Kobayashi et al. ...... 361/679.09
2009/0300251 A1 12/2009 Lu

* cited by examiner

ELECTRONIC DEVICE WITH SEPARABLE MODULE

FIELD OF THE INVENTION

The present invention relates to an electronic device with a separable module and, more particularly to an electronic device, such as a notebook computer, which includes a main unit having a separable modular forming an upper portion that can be freely separated from and reassembled to a base of the main unit.

BACKGROUND OF THE INVENTION

Following the progress in the technological fields, various new electronic products are constantly introduced into the market. Meanwhile, different electronic elements or components are also developed for use with these new electronic products. Inevitably, the maintenance or updating of the electronic products and the electronic elements thereof occurs more often than before.

Taking the notebook computer as an example, the quick development in software and hardware for computers frequently requires a user to install new or additional electronic elements or components in the main unit of the notebook computer. According to the present operation procedures, the user has to open a back cover of the main unit of the notebook computer before he or she can install the required electronic elements or components.

The back cover for the main unit of the conventional notebook computer is usually screwed to the main unit. To open the back cover, the whole notebook computer must be firstly turned upside down. That is, the notebook computer is now positioned with a top cover of the display unit thereof in contact with the table. Then, the screws fastened to the back cover must be loosened one by one in order to open the back cover and allow the user to maintain or update the electronic elements or components in the main unit. It is apparently inconvenient for the user to open the back cover of the main unit in the above-described manner.

First, in most cases, the notebook computer must be positioned on the table with the display side in contact with the table to allow opening of the back cover and maintaining or updating the electronic elements. By doing this, there is risk of damaging the display unit in contact with the table. Second, the screws on the back cover must be loosened with a tool. Screws of different specifications require different screwdrivers to loosen them, bringing inconvenience to the user in opening the back cover of the main unit.

It is therefore tried to develop an electronic device with a separable module to improve the above-mentioned drawbacks in opening the back cover of an electronic device, such as a notebook computer.

SUMMARY OF THE INVENTION

A primary object of the present invention is to provide an electronic device with a separable module, so that an operator intending to install additional components or to maintain existing components for the electronic device, such as a notebook computer, does not need to use any tool to disassemble a back cover of the notebook computer from a main unit thereof, and the risk of undesirably damaging the display unit of the notebook computer is avoided.

To achieve the above and other objects, the electronic device with a separable module according to the present invention includes a display unit and a main unit. A circuit board of the electronic device is provided in the main unit, and the display unit is connected at an edge to one edge of the main unit. The main unit includes a separable module and a base. The separable module is provided along two opposite shorter edges with a plurality of spaced hooking elements. The base has the circuit board held therein and is provided with at least a plurality of retaining slots corresponding to the hooking elements on the separable module. The separable module is removably covered on the base with the hooking elements engaged with the retaining slots, so that the separable module and the base are fixedly held to each other.

The separable module is provided on one side with at least one carrier member, and the base is provided with at least one magnetic element corresponding to the carrier member. When the carrier member is magnetically attracted to the magnetic elements, the separable module can be preliminarily covered on the base and the hooking elements are aligned with the retaining slots. Then, the separable module can be slid to engage the hooking elements with the retaining slots. In the present invention, the carrier member can be a metal mask.

In the electronic device of the present invention, the separable module further includes at least one stop post located on one side of the separable module facing toward the base, and the base is provided with at least one first stop hole corresponding to the at least one stop post. When the separable module is covered onto the base, the at least one stop post is engaged with the at least one first stop hole. Further, the separable module is provided along two opposite longer edges respectively with at least one protrusion, and the base is provided along two opposite longer edges respectively with at least one recess corresponding to the protrusions. When the separable module is fittingly covered onto the base, the at least one protrusion is engaged with the at least one recess.

In an operable embodiment of the present invention, the base is further provided with at least one locating unit. The locating unit includes a holding portion, a push portion and an elastic element. The holding portion is a hollow post and has an end formed with an opening and another opposite end fixedly mounted to one side of the base. The push portion is received in the holding portion with an end exposed from the opening. The elastic element is disposed in the holding portion to forward press against the push portion. When a force is externally applied to the push portion, the elastic element is compressed and the push portion is retracted relative to the holding portion. When the applied force is released, the elastic element pushes the push portion back to an initial position thereof. The separable module further includes at least one second stop hole corresponding to the at least one locating unit on the base. When the separable module is covered onto the base, the push portion of the at least one locating unit is in its initial position to extend into the at least one second stop hole, so that the separable module is restricted by the push portion from displacing relative to the base. When the push portion is subjected to an external force applied thereto, it is retracted to locate below the second stop hole and no longer restricts the separable module from displacing relative to the base.

In the electronic device of the present invention, the separable module can be a modularized device, such as a touch panel module, a wireless keyboard module, or an electronic book module. Alternatively, the separable module can be just a single piece of shielding panel. The separable module further includes a first connector provided on one side thereof, and the base is further provided with a second connector, such that the first connector and the second connector are electrically connected to each other when the separable module is covered onto the base.

With the above arrangements, the electronic device with a separable module according to the present invention has one or more of the following advantages:

(1) The main unit of the electronic device is configured to include a separable module. An operator can directly slide the separable module to separate the same from the base of the main unit and accesses the inner side of the main unit for the purpose of maintaining the existing components or installing additional components without the need of troublesomely using any tool to loosen a large number of fastening elements, such as screws. Therefore, the drawbacks in the prior art electronic devices are overcome.

(2) By providing the main unit with the separable module, an operator is able to open the main unit and accesses the components therein without the need of turning the electronic device upside down. Therefore, the risk of damaging the display unit of the electronic device, particularly a notebook computer, is largely reduced.

(3) The separable module can be a modularized touch panel module, wireless keyboard module, or electronic book module for the electronic device or the notebook computer to provide diversified functions.

(4) The electronic device with a separable module can have an integral and beautiful appearance to satisfy the user's demands, because there are no exposed screws for fastening the back cover to the main unit of the electronic device.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
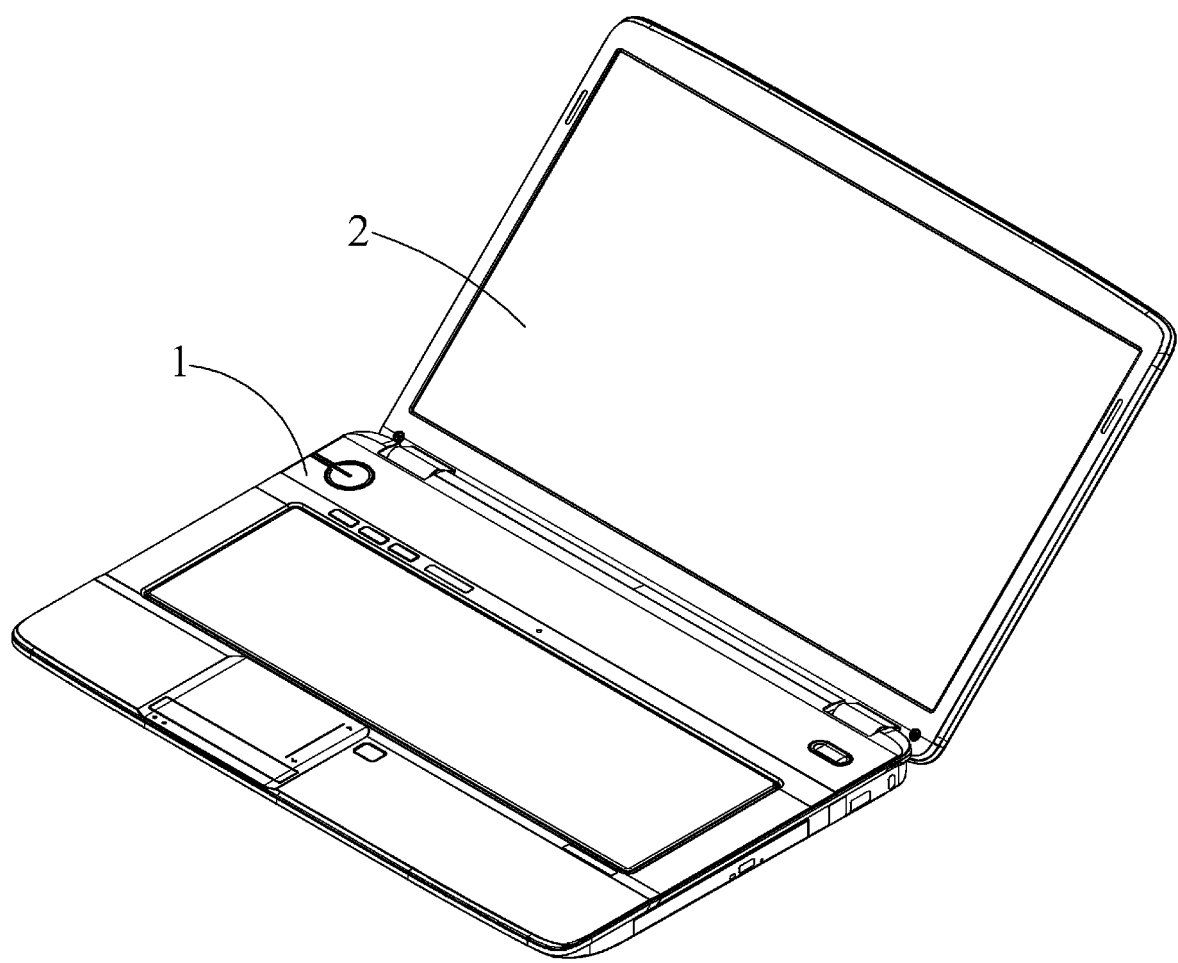
FIG. 1 is a perspective view of an electronic device according to a first embodiment of the present invention with a separable module and a base forming a main unit thereof in an assembled state.
Figure 2:
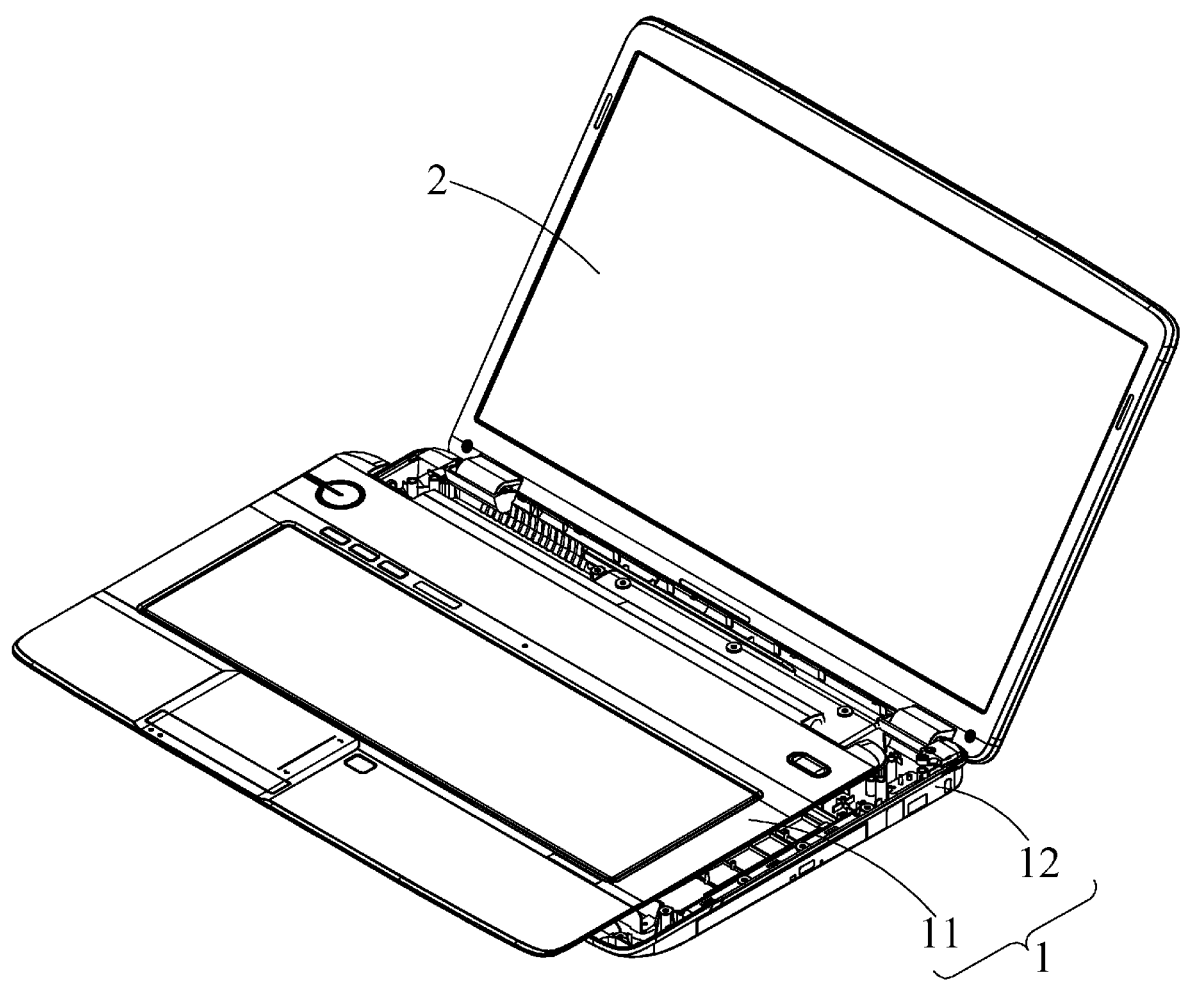
FIG. 2 shows the electronic device of FIG. 1 with the separable module separated from the base.

The present invention will now be described with some preferred embodiments thereof. For the purpose of easy understanding, elements that are the same in the preferred embodiments are denoted by the same reference numerals. Please refer to FIGS. 1 and 2 that are perspective views of an electronic device according to a first embodiment of the present invention showing a separable module and a base thereof in an assembled and a separated state, respectively. In the illustrated embodiment, the electronic device is described as a notebook computer. However, it is understood the electronic device may be other types of electronic devices without being limited to the notebook computer. As shown, the electronic device includes a main unit 1 and a display unit 2 pivotally connected at an edge to one edge of the main unit 1. The main unit 1 includes a separable module 11 and a base 12. In the illustrated first embodiment, the separable module 11 can be slid in a direction opposite to the edge of the main unit 1 connected with the display unit 2 in order to separate from the base 12.

Figure 3:
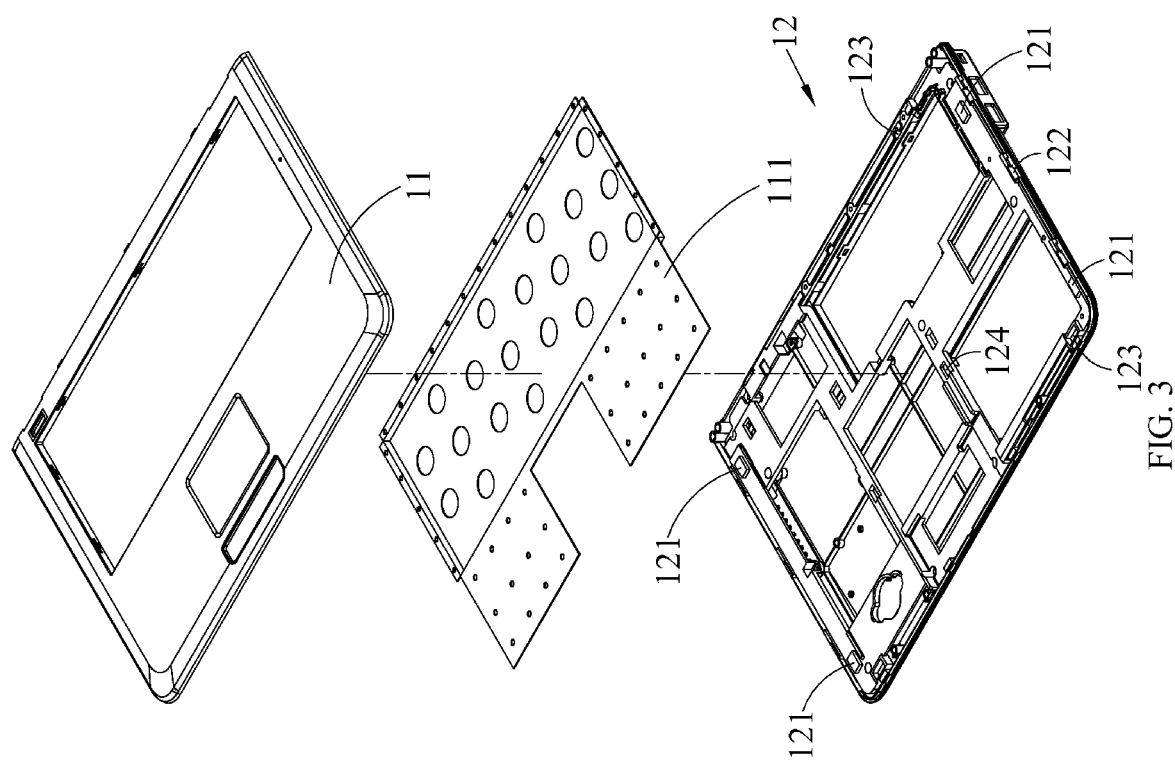
FIG. 3 is an exploded perspective view of the main unit of the electronic device according to the first embodiment of the present invention.

Please refer to FIG. 3, which is an exploded perspective view of the main unit 1 of the electronic device according to the first embodiment of the present invention. As shown, in addition to the separable module 11 and the base 12, the main unit 1 further includes a carrier member 111 located below the separable module 11 for supporting other components provided on the separable module 11, such as a keyboard, and reducing possible electromagnetic interference with and from the electronic device. In the illustrated first embodiment, the carrier member 111 is implemented as a metal mask without being limited thereto. The base 12 is provided with a plurality of magnetic elements 121 spaced near and along the edges of the base 12, such that the magnetic elements 121 located corresponding to the carrier member 111 magnetically attract to each other.

Figure 4:
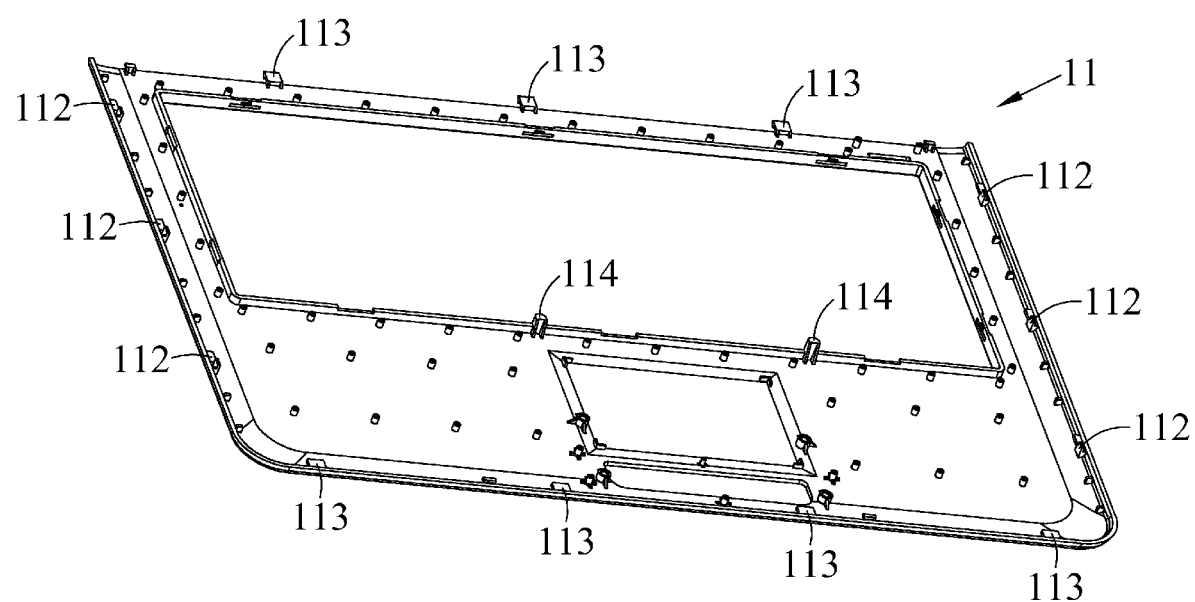
FIG. 4 is a bottom perspective view of the separable module for the main unit of FIG. 3 with a carrier member of the separable module omitted from the drawing.
Figure 5:
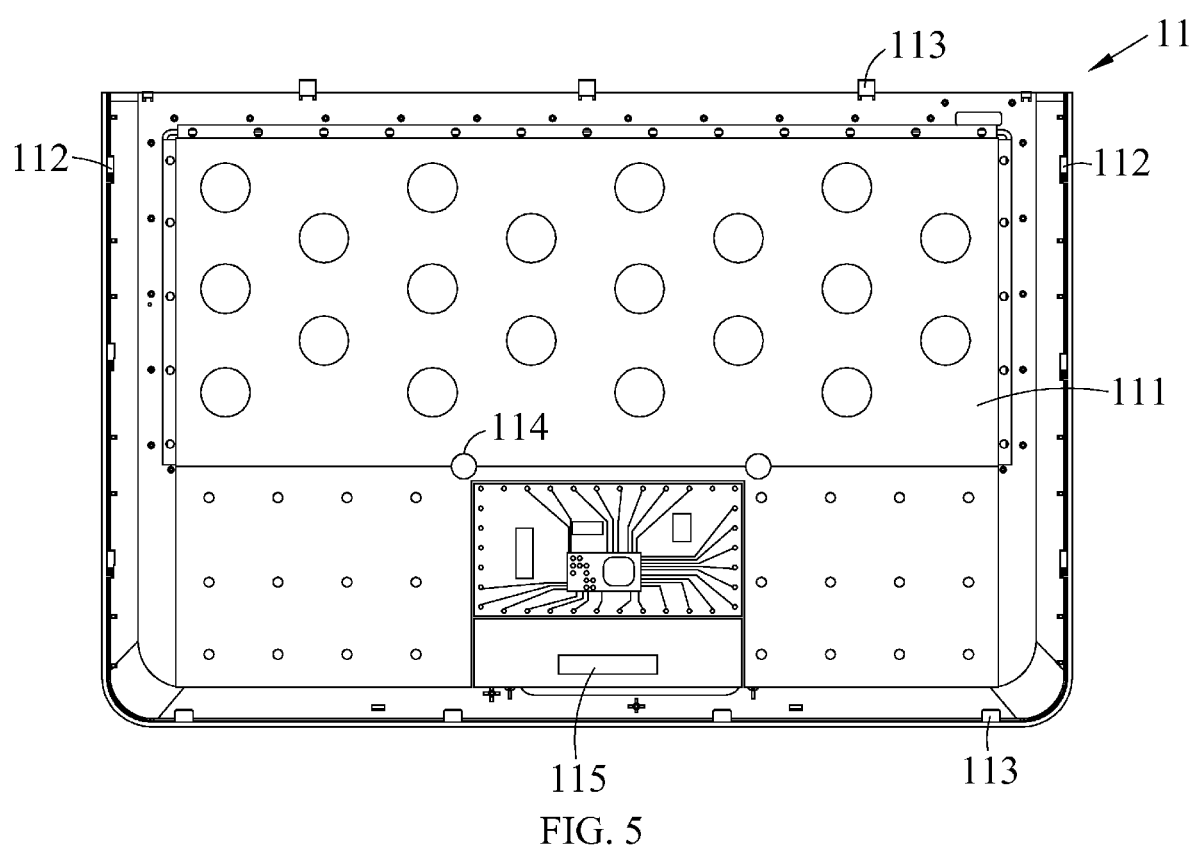
FIG. 5 is a bottom plan view of the separable module of FIG. 4 with the carrier member attached thereto.

FIGS. 4 and 5 are bottom perspective and plan views, respectively, of the separable module 11 according to the first embodiment of the present invention. As shown, the separable module 11 is provided with a plurality of hooking elements 112, protrusions 113, and stop posts 114. The hooking elements 112 are spaced along two opposite shorter edges of the separable module 11, while the protrusions 113 are spaced along two opposite longer edges of the separable module 11 (one of the longer edges is the edge of the separable module adjacent to the display unit). However, it is understood the hooking elements 112 and the protrusions 113 on the separable module 11 can be arranged in other manners without being limited to the above described manner. On one side of the separable module 11 facing toward the base 12 (not shown in FIGS. 4 and 5), there are provided the carrier member 111 and a first connector 115. The stop posts 114 are downward extended through and projected from the carrier member 111. The first connector 115 is electrically connected to a circuit board (not shown) of the electronic device provided in the base 12.

In the illustrated first embodiment, the separable module 11 can be a modularized touch panel module, wireless keyboard module, or electronic book module, or can be just a single piece of shielding panel, without being limited thereto.

Figure 6:
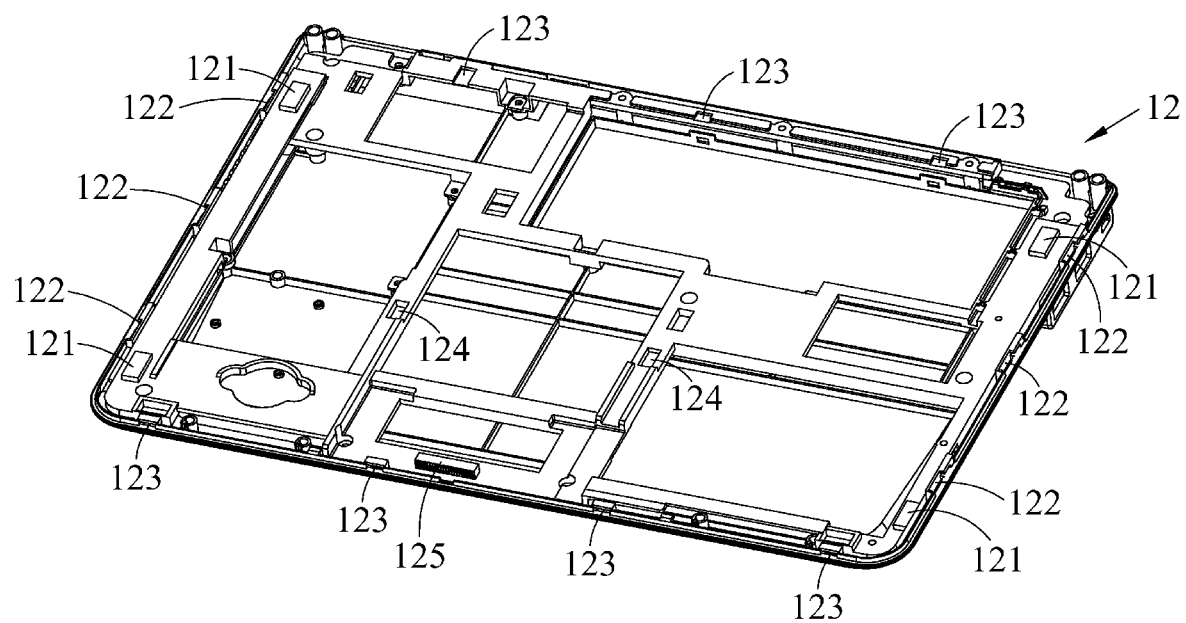
FIG. 6 is a top perspective view of a base for the main unit of the electronic device according to the first embodiment of the present invention.
Figure 7:
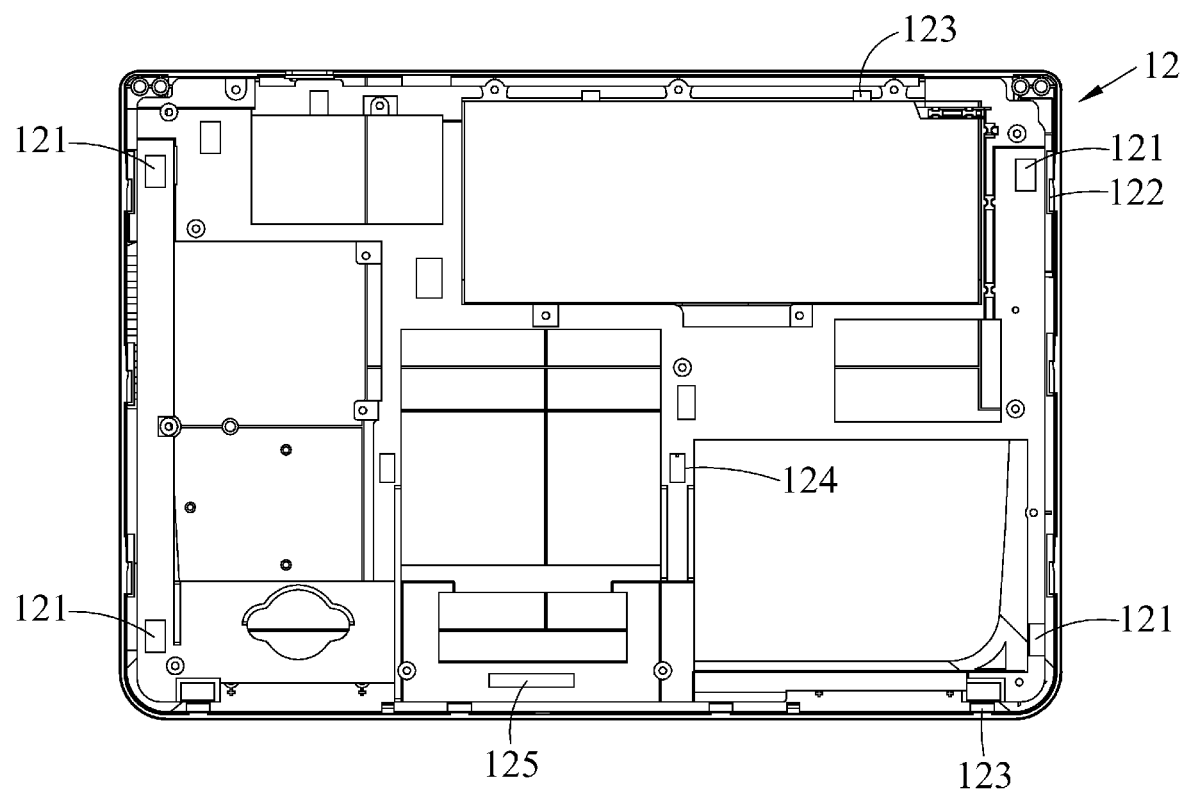
FIG. 7 is a top plan view of the base of FIG. 6.

Please refer to FIGS. 6 and 7 that are top perspective and plan views, respectively, of the base 12 according to the first embodiment of the present invention. As shown, the base 12 is provided with a plurality of spaced magnetic elements 121 corresponding to the carrier member 111 (not shown in FIGS. 6 and 7), so that the base 12 and the carrier member 111 are magnetically attracted to each other. In the illustrated first embodiment, the magnetic elements 121 are located near and along the edges of the base 12 without being limited thereto. The magnetic elements 121 can be located at other places on the base 12, so long as they correspond to the carrier member 111. With these arrangements, the separable module 11 can be preliminarily covered onto the base 12 to enable subsequent fine adjustment in position to correctly align components on the separable module 11 with corresponding components on the base 12.

The base 12 is provided with a plurality of first stop holes 124 corresponding to the stop posts 114 on the separable module 11. In the illustrated first embodiment, the first stop holes 124 are square holes without being limited thereto. Through engagement of the stop posts 114 with the first stop holes 124, the separable module 11 can be conveniently aligned with and held to the base 12. The quantity and the shape of the first stop holes 124 are determined according to those of the stop posts 114. Therefore, the first stop holes 124 may be oblong holes, 8-figured holes, or other geometrical shapes that provide equivalent stopping effect.

The base 12 is provided along two opposite shorter edges with a plurality of spaced retaining slots 122 corresponding to the hooking elements 112 on the separable module 11, and along two opposite longer edges with a plurality of spaced recesses 123 corresponding to the protrusions 113 (not shown in FIGS. 6 and 7) on the separable module 11, so that the protrusions 113 are detachably received in and engaged with the recesses 123. The base 12 is further provided with a second connector 125, which is located corresponding to and electrically connected to the first connector 115 (not shown in FIGS. 6 and 7).

Please refer to FIGS. 1 and 2 again. To reassemble the separated separable module 11 to the base 12 of the main unit 1, first approach the separable module 11 toward the base 12, so that the carrier member 111 is magnetically attracted to the magnetic elements 121 on the base 12 to thereby preliminarily hold the separable module 11 to the base 12. Then, slide the separable module 11 toward the edge of the main unit 1 connected with the display unit 2 for the stop posts 114 to engage with the corresponding first stop holes 124, so that the separable module 11 is held to the base 12. Thereafter, keep sliding the separable module 11 toward the edge of the main unit 1 connected with the display unit 2 for the hooking elements 112 spaced along the edges of the separable module 11 to engage with corresponding retaining slots 122 spaced along the edges of the base 12. Meanwhile, the protrusions 113 on the separable module 11 are brought to engage with the recesses 123 on the base 12. At this point, the separable module 11 is fully and correctly assembled to the base 12.

Please refer to FIGS. 5 and 7 at the same time. When the separable module 11 is correctly assembled to the base 12, the first connector 115 and the second connector 125 are electrically connected to each other, bringing the modularized separable module 11 to electrically connect to the circuit board of the electronic device provided in the base 12 for executing computation or other desired commands or instructions.

To separate the separable module 11 from the base 12, first push the separable module 11 away from the edge of the main unit 1 connected with the display unit 2, so that the first connector 115, the protrusions 113, the hooking elements 112, the stop posts 114, and the carrier member 111 on the separable module 11 are sequentially separated from the second connector 125, the recesses 123, the retaining slots 122, the first stop holes 124 and the magnetic elements 121 to complete the separation of the separable module 11 from the base 12.

Figure 8:
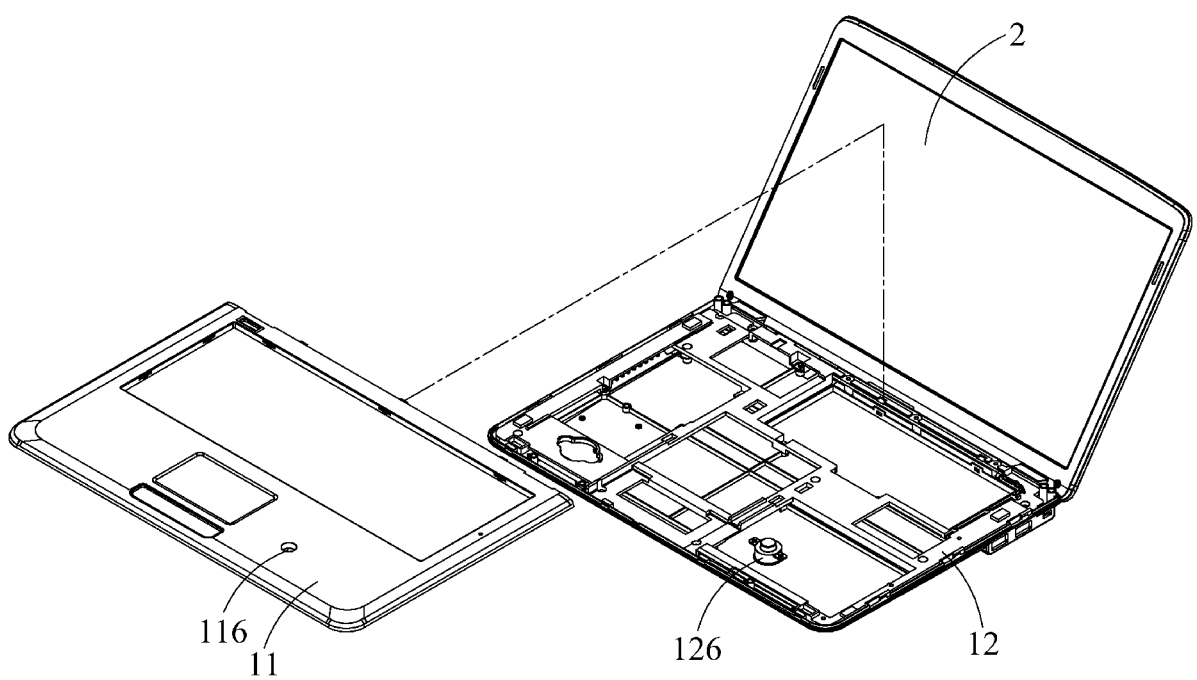
FIG. 8 is a perspective view of an electronic device according to a second embodiment of the present invention with a separable module and a base forming a main unit thereof in a separated state.
Figure 9:
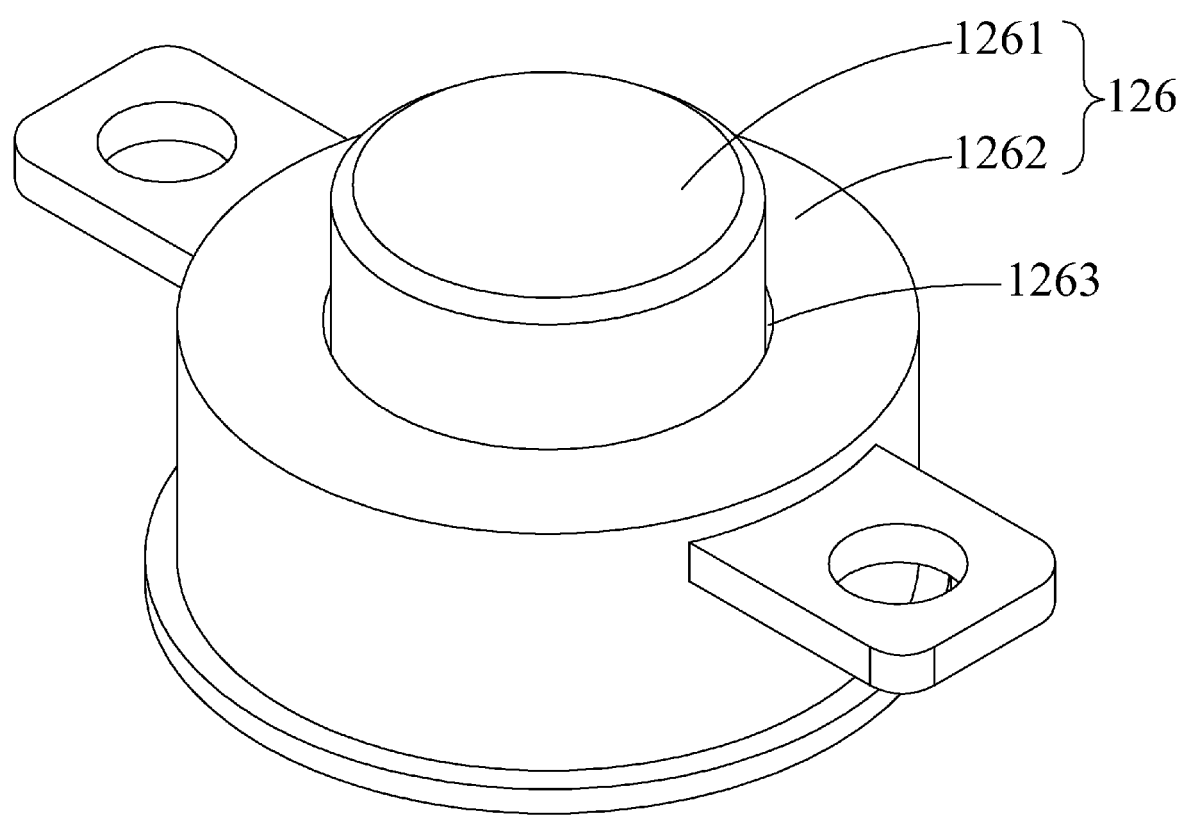
FIG. 9 is an enlarged view of a locating unit for holding the separable module to the base of the electronic device according to the second embodiment of the present invention.

FIG. 8 shows an electronic device according to a second embodiment of the present invention, in which a separable module 11 and a base 12 of a main unit 1 thereof are in a separated state. The second embodiment is generally structurally similar to the first embodiment, except that the second embodiment further includes at least one locating unit 126 provided on the base 12 and at least one second stop hole 116 provided on the separable module 11 corresponding to the at least one locating unit 126. Please refer to FIGS. 8 and 9 at the same time. FIG. 9 is an enlarged perspective view of the locating unit 126 according to the present invention. As shown, the locating unit 126 includes a push portion 1261 and a holding portion 1262. The holding portion 1262 is a hollow post having an end formed with an opening 1263 and another opposite end fixedly mounted on the base 12. The push portion 1261 has an end exposed from the opening 1263 and another opposite end received in the holding portion 1262.

Figure 10:
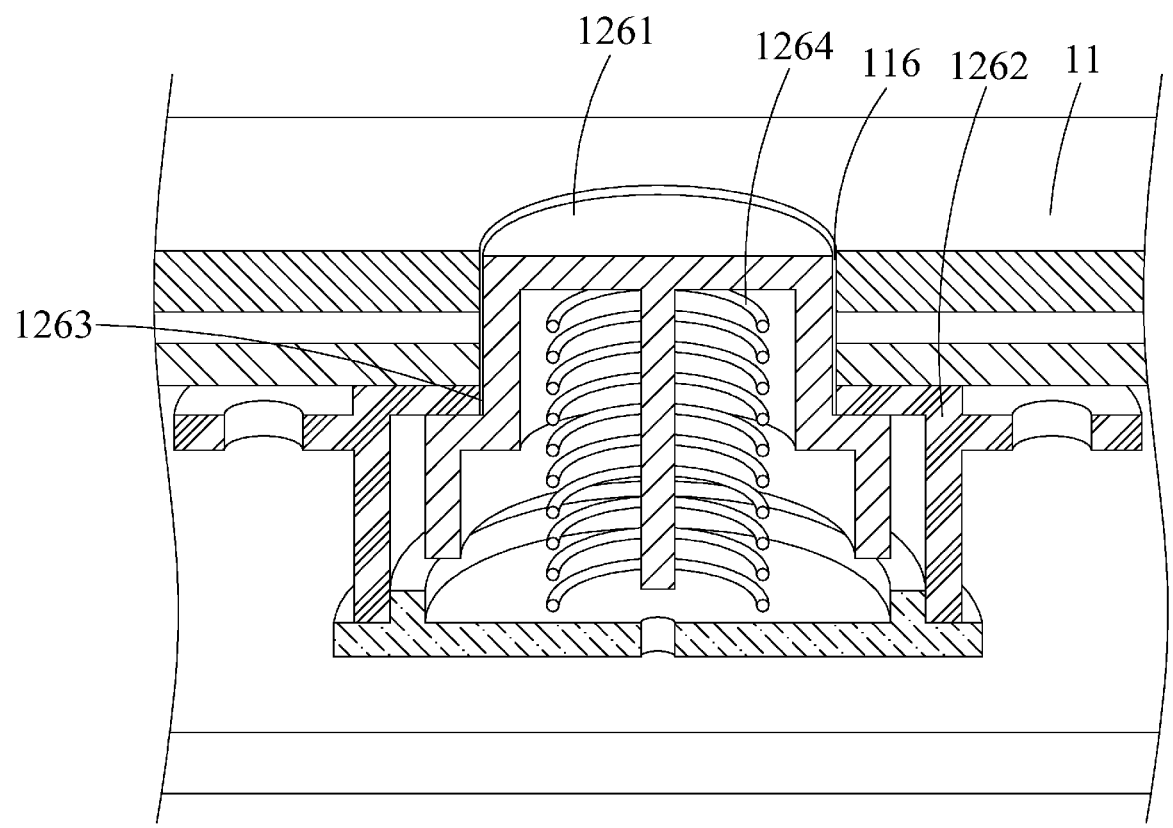
FIG. 10 shows the locating unit of FIG. 9 in engagement with the separable module.
Figure 11:
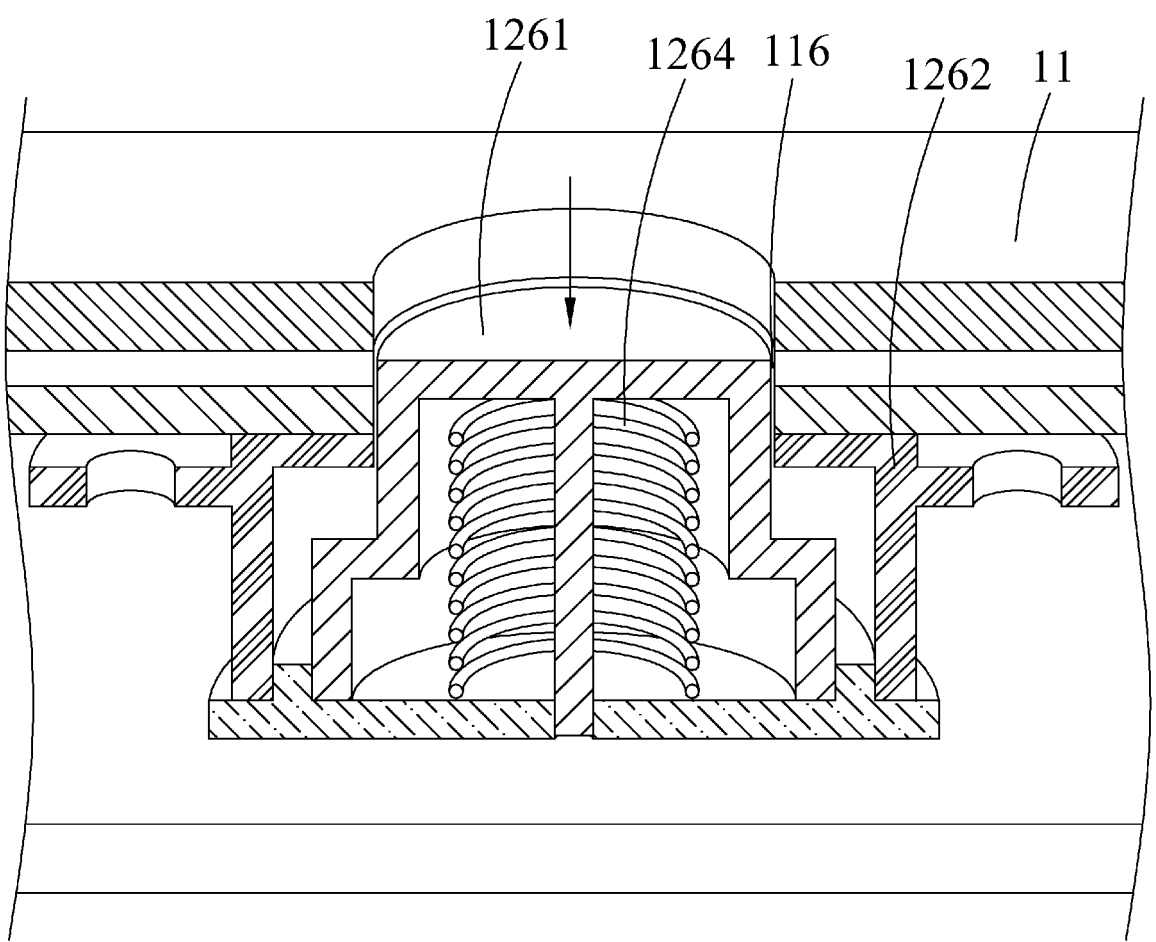
FIG. 11 shows the locating unit of FIG. 9 disengaged from the separable module.

FIGS. 10 and 11 show the operation of the locating unit 126 according to the present invention. Please refer to FIGS. 8 to 11 at the same time. As shown, an elastic element 1264 is disposed in the holding portion 1262 to forward press against the push portion 1261. When a force is externally applied to the push portion 1261, the elastic element 1264 is compressed, and the push portion 1261 is retracted relative to the holding portion 1262, as shown in FIG. 11. On the other hand, when the applied force is released, the elastic element 1264 will push the push portion 1261 to an initial position thereof, as shown in FIG. 10.

The push portion 1261, without being subjected to any externally applied force, is extended into the second stop hole 116, so that the separable module 11 is restricted from displacing relative to the base 12. When it is desired to separate the separable module 11 from the base 12, as shown in FIG. 8, first apply an external force to the push portion 1261, so that the push portion 1261 is retracted to locate below the second stop hole 116, allowing the separable module 11 to be separated from the base 12.

The present invention has been described with some preferred embodiments thereof, and it is understood that many changes and modifications in the described embodiments can be carried out without departing from the scope and the spirit of the invention that is intended to be limited only by the appended claims.

What is claimed is:

1. An electronic device with a separable module, comprising a display unit and a main unit, with the main unit internally provided with a circuit board of the electronic device, with the display unit connected at an edge to one edge of the main unit; wherein the main unit comprises a separable module and a base;

with the separable module including at least a plurality of hooking elements spaced along edges of the separable module;

with the base having the circuit board located therein and including at least a plurality of retaining slots spaced along edges of the base corresponding to the plurality of hooking elements on the separable module;

wherein the separable module is removably covered on the base, and, when the separable module is fittingly covered on the base, the plurality of hooking elements is respectively engaged with the plurality of retaining slots to firmly hold the separable module and the base to each other, wherein the separable module further includes at least one stop post located on one side of the separable module facing toward the base, and the base is provided with at least one first stop hole corresponding to the at least one stop post; whereby when the separable module is covered onto the base, the at least one stop post is engaged with the at least one first stop hole.

2. The electronic device as claimed in claim 1, wherein the separable module further includes a carrier member located at one side of the separable module, and wherein the base is provided with at least one magnetic element corresponding to the carrier member; with the separable module covered on the base through magnetic attraction of the carrier member to the at least one magnetic element and engagement of the plurality of hooking elements with the plurality of retaining slots.

3. The electronic device as claimed in claim 1, wherein the separable module further includes at least one protrusion located near an edge of the separable module adjacent to the display unit, wherein the base is provided with at least one recess corresponding to the at least one protrusion; and wherein when the separable module is covered onto the base, the at least one protrusion is engaged with the at least one recess.

4. The electronic device as claimed in claim 2, wherein the carrier member is a metal mask.

5. An electronic device with a separable module, comprising a display unit and a main unit, with the main unit internally provided with a circuit board of the electronic device, with the display unit connected at an edge to one edge of the main unit; wherein the main unit comprises a separable module and a base;
  with the separable module including at least a plurality of hooking elements spaced along edges of the separable module;
  with the base having the circuit board located therein and including at least a plurality of retaining slots spaced along edges of the base corresponding to the plurality of hooking elements on the separable module;
  wherein the separable module is removably covered on the base, and, when the separable module is fittingly covered on the base, the plurality of hooking elements is respectively engaged with the plurality of retaining slots to firmly hold the separable module and the base to each other, wherein the base is further provided with at least one locating unit; with the at least one locating unit including:
  a holding portion being a hollow post and having an end formed with an opening and another opposite end fixedly mounted to one side of the base;
  a push portion having an end exposed from the opening on the holding portion and another opposite end received in the holding portion; and
  an elastic element disposed in the holding portion to forward press against the push portion;
  wherein when a force is externally applied to the push portion, the elastic element is compressed and the push portion is retracted relative to the holding portion; and
  wherein when the applied force is released, the elastic element pushes the push portion back to an initial position thereof.

6. The electronic device as claimed in claim 5, wherein the separable module further includes at least one stop hole corresponding to the at least one locating unit on the base; and wherein when the separable module is covered onto the base, the push portion of the at least one locating unit is extended into the at least one stop hole to restrict the separable module from displacing relative to the base.

7. The electronic device as claimed in claim 5, wherein the separable module is a modularized device selected from the group consisting of a touch panel module, a wireless keyboard module, and an electronic book module.

8. The electronic device as claimed in claim 5, wherein the separable module further includes a first connector provided on one side of the separable module facing toward the base and electrically connected to the separable module; wherein the base is further provided with a second connector electrically connected to the circuit board of the electronic device; with the first connector and the second connector electrically connected to each other when the separable module is fittingly covered onto the base.

9. The electronic device as claimed in claim 6, wherein the push portion having an external force applied thereto is retracted to locate below the at least one stop hole and no longer restricts the separable module from displacing relative to the base.

* * * * *